United States Patent [19]

Yamada et al.

[11] Patent Number: 5,691,988
[45] Date of Patent: Nov. 25, 1997

[54] METHOD FOR MEASURING THE SENSITIVITIES AND INTERFERENCE WAVE PROPERTIES FO RECEIVERS

[75] Inventors: Katsuji Yamada; Mitusru Yokoyama; Masatoshi Obara, all of Hyogo, Japan

[73] Assignee: Hewlett-Packard Company, Palo Alto, Calif.

[21] Appl. No.: 559,438

[22] Filed: Nov. 15, 1995

[30] Foreign Application Priority Data

Nov. 17, 1994 [JP] Japan .................... 6-308181

[51] Int. Cl.$^6$ ............................................. G06F 11/00
[52] U.S. Cl. ................................. 371/5.1; 371/5.5
[58] Field of Search .......................... 371/5.1, 5.2, 5.5, 371/67.1, 68.1, 68.2, 28

[56] References Cited

U.S. PATENT DOCUMENTS

| | | | |
|---|---|---|---|
| 4,891,812 | 1/1990 | Bocci et al. | 371/5.5 |
| 5,418,789 | 5/1995 | Gersbash et al. | 371/5.2 |
| 5,488,618 | 1/1996 | Kondo et al. | 371/67.1 |
| 5,490,148 | 2/1996 | Carson | 371/5.1 |
| 5,550,837 | 8/1996 | Chang | 371/5.5 |

OTHER PUBLICATIONS

Research & Development Center for Radio Systems (RCR)–RCR STD–27B–'Personal Digital Cellular Telecommunication System'–Apr. 30th, 1991–(pp. 33–35; 628–635).

Masayoshi Murotani and Heiichi Yamamoto–'Digital Wireless Communication'–Aug. 8, 1985–(pp. 33–34)–in Japanese language.

*Primary Examiner*—Robert W. Beausoliel, Jr.
*Assistant Examiner*—Trinh L. Tu

[57] ABSTRACT

A system enables highly accurate measurements to be performed automatically on test receivers, with good efficiency, irrespective of bit error rate vs. reception input level. The system is provided with two means for estimating the reception input level at which the bit error rate of a receiver will be a prescribed value. The estimation error in the first estimation means is estimated; when said error is smaller than the allowed value, the reception input level is estimated by the first estimation means, and when said error is larger than the allowed value, the operation is switched automatically to the second estimation means, and the reception input level is estimated by the second estimation means. In the first estimation means, the characteristic of the bit error rate is modeled by a second-order approximation equation and the reception input level Lx corresponding to the prescribed bit error rate Bs is obtained by calculation. The second-order approximation equation is obtained by the least squares method, after measuring the bit error rates corresponding to the reception input levels La–Le. The second estimation means uses a first-order approximation.

3 Claims, 5 Drawing Sheets

METHOD FOR MEASURING THE SENSITIVITIES AND INTERFERENCE WAVE PROPERTIES FO RECEIVERS

FIELD OF THE INVENTION

This invention relates to a method for measuring the reception sensitivity, adjacent channel selectivity, intermodulation characteristics, and spurious sensitivity characteristic of digital communications equipment.

BACKGROUND OF THE INVENTION

First, the definitions of reception sensitivity, adjacent channel selectivity, intermodulation characteristics, and spurious sensitivity characteristic of digital communications equipment will be specified.

Reception sensitivity is defined as the input level of a reception signal at which the bit error rate is a prescribed value. The reception signal is a high-frequency signal modulated by a prescribed digital signal.

Adjacent channel selectivity is the ratio of the interference wave level and the desired wave level when a desired wave signal at a prescribed level and an interference wave modulated by a prescribed digital signal are applied to a receiver and the bit error rate due to the interference wave becomes a prescribed value. The desired wave signal is a high-frequency signal modulated by a prescribed digital signal. This is also true in the cases of the intermodulation characteristics and spurious sensitivity characteristic mentioned below.

The intermodulation characteristics is the ratio of the interference wave level and the desired wave level when a desired wave signal is at a prescribed level and two interference waves, separated by a prescribed quantity, are applied to a receiver and the bit error rate due to said interference wave becomes a prescribed value. The interference wave is unmodulated.

The spurious sensitivity characteristic is the ratio of the interference wave level and the desired wave level when a desired wave signal at a prescribed level and an interference wave are applied to a receiver and the bit error rate due to the interference wave becomes a prescribed value. In this case also, the interference wave is unmodulated.

Furthermore, in this Specification, the adjacent channel selectivity, the intermodulation characteristics, and the spurious sensitivity characteristic are referred to together as the interference wave characteristics.

The method for measuring the sensitivity and interference wave characteristics according to these definitions are shown by diagrams, and the essentials of the measurement method will be discussed.

The sensitivity measurement is performed according to FIG. 6. The output signal from signal generator 1, which generates a high-frequency signal modulated by a prescribed digital signal, passes through adjustment and junction circuit 2 and is inputted into a test receiver 3. This signal is the reception signal. The bit error rate of the demodulated data of test receiver 3 is measured by a bit error measurement device 4. The level of the reception signal is changed, and the level at which the bit error rate becomes a prescribed value is measured and is taken as the sensitivity.

The measurement of the interference wave characteristic is performed according to FIG. 7. An interference wave generated by the signal generator 5, which generates a high-frequency interference wave, is applied to adjustment and junction circuit 2 and the sum of this signal and the output of signal generator 1 (desired signal) is inputted to test receiver 3. The level of the desired signal is held at a prescribed value and the level of the interference wave is changed; the level of the interference wave corresponding to the prescribed bit error rate is measured, and is taken as the interference wave characteristic value.

When the intermodulation characteristics is measured, two signal generators for interference waves are required; therefore, as shown in FIG. 8, the interference wave signal generator 6 is additionally connected to adjustment and junction circuit 2.

Devices for measuring sensitivity and interference characteristics generally have the make-up shown in FIG. 9. The calculation and control part 7 controls the high-frequency signal generators and bit error measurement device according to the definitions and measurement methods of the aforementioned measurements, and performs calculation processing of the measurement data.

The characteristic of the bit error rate with respect to the reception signal level of the receiver ordinarily shows a tendency such as that shown in FIG. 4. Moreover, the characteristic of the bit error rate with respect to the interference wave level is as shown in FIG. 5.

In the sensitivity measurement, as shown in FIG. 4, the reception signal level Lx which corresponds to the prescribed bit error rate Bs is measured, and in the interference wave characteristics measurement, as shown in FIG. 5, the interference wave level Lx which corresponds to the prescribed bit error rate Bs is measured. Here, the reception signal, in the case of the sensitivity measurement, and the interference wave, in the case of the interference wave characteristic measurements, are referred to in general terms as the "reception input. Moreover, "the reception signal level or interference wave level (reception input level) at which the bit error rate becomes a prescribed value" will be simplified to "the desired level".

The only difference between the sensitivity measurement and the interference wave characteristic measurements is that the polarity of increase in the bit error rate with respect to the increase in the reception input level is different; there are no essential differences with respect to the measurement of the reception input level Lx corresponding to the prescribed bit error rate Bs. Therefore, the discussion below will concern primarily the sensitivity measurement, and only a supplementary explanation of the interference wave characteristics measurement will be given.

As mentioned above, in the cases of measuring bit error rate and reception input level, it is the reception input level, not the bit error rate, which can be controlled by the bit error measurement device. Therefore, the desired level cannot be obtained by one bit error rate measurement. Therefore, in the conventional technology, the following method is employed.

First, there is a method of searching for the desired level while repeating the measurement. This method has the drawback that wasted measurements are repeated until the desired level is reached, although this depends on the search method, the reception input level at which the search begins, and the level quantity changed.

Another method is that in which an approximation equation is obtained and the desired level is estimated. It is known that the bit error rate theoretically varies exponentially with respect to the input level of the reception input (dBm). Therefore, the bit error rate is measured at several reception input levels and an approximation equation of this function is obtained; this equation is solved, and the desired level is estimated. However, in reality, as opposed to theory, the function is not exponential; therefore, errors may be produced in measurements performed by the conventional measurement method which assumes that the reception input level varies according to a certain function.

In order to perform highly accurate measurements with good efficiency, without performing wasted measurements and without producing errors in the estimation and search, a number of reception input levels and level values are important. However, in cases in which the characteristics of the test receiver are unknown, these are of course difficult to determine.

Therefore, the need for highly accurate and efficient automatic measurements of the sensitivity and interference wave characteristics of test receivers with unknown bit error rate vs. reception input level characteristics has not yet been satisfied.

SUMMARY OF THE INVENTION

A method is proposed according to which highly accurate measurement can be performed automatically and with high efficiency, regardless of the characteristic of the bit error rate with respect to the reception input level of the receiver being tested. The method performs highly accurate measurements with good efficiency and employs two estimation means: one which estimates the desired level by obtaining a second-order approximation equation which models the bit error rate vs. reception input level; and one which estimates the desired level by obtaining a first-order approximation equation. In the first means, the error is estimated by means of a second-order approximation equation, and when the error is smaller than a prescribed value, the estimation is completed by the second-order approximation equation, whereas when it is greater than the prescribed value, the desired reception input level is estimated by obtaining a first-order approximation equation.

Explanation of Symbols

1: High-frequency signal generator for receiver signals;
2: Adjustment and junction circuit;
3: Test receiver;
4: Bit error measurement device;
5: High-frequency signal generator for interference wave;
6: High-frequency signal generator for interference wave;
7: Calculating and control part;
Ba: Bit error rate measurement value when the reception input level is La;
Bb: Bit error rate measurement value when the reception input level is Lb;
Bc: Bit error rate measurement value when the reception input level is Lc;
Bd: Bit error rate measurement value when the reception input level is Ld;
Be: Bit error rate measurement value when the reception input level is Le;
Bs: Prescribed bit error rate;
B1: Bit error rate measurement value when the reception input level is L1;
B2: Bit error rate measurement value when the reception input level is L2;
B3: Bit error rate measurement value when the reception input level is L3;
B4: Bit error rate measurement value when the reception input level is L4;
B5: Bit error rate measurement value when the reception input level is L5;
B6: Bit error rate measurement value when the reception input level is L6;
La: Reception input level;
Lb: Reception input level;
Lc: Reception input level;
Ld: Reception input level;
Le: Reception input level;
Lx: Reception input level at which bit error rate becomes Bs (desired level);
L1: Reception input level;
L2: Reception input level;
L3: Reception input level;
L4: Reception input level;
L5: Reception input level;
L6: Reception input level.

DETAILED DESCRIPTION OF THE INVENTION

Figure 10:
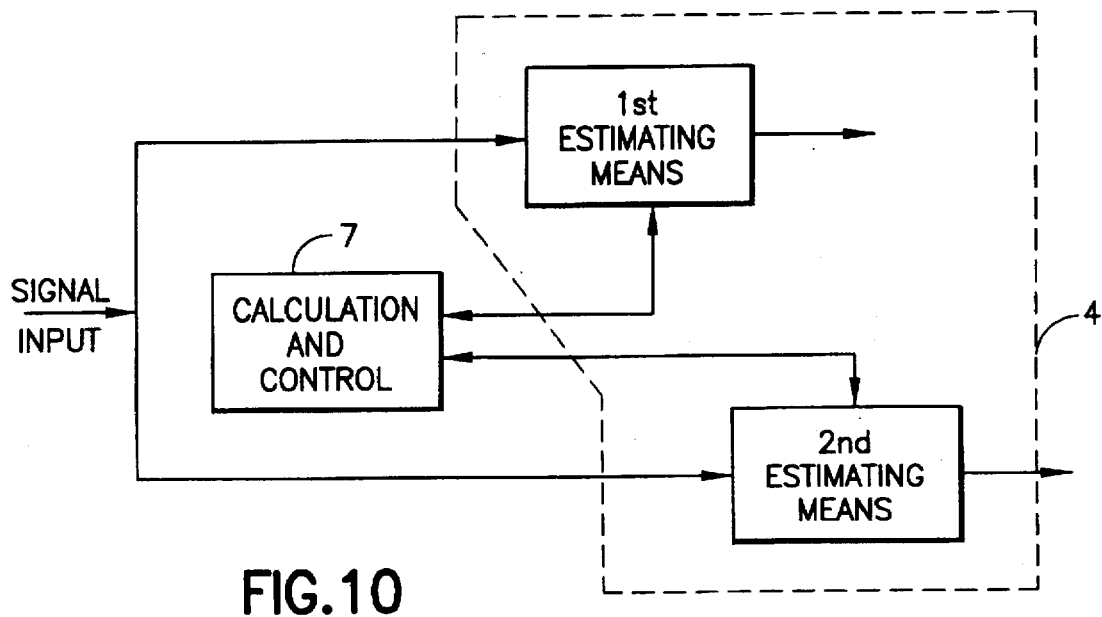
FIG. 10: Diagram showing further details of Bit Error Measurement block 4.

An example of the measurement method of this invention is shown in FIG. 10 and is as follows. In a first estimation means, it is assumed first that the bit error rate vs. reception input level characteristic is close to the theoretical value, and a second-order approximation equation is obtained (the method for obtaining the approximation equation will be discussed below). If the error of the second-order approximation equation is at or below an allowed level, the desired level is estimated from the prescribed bit error rate and the measurement is completed.

Figure 9:
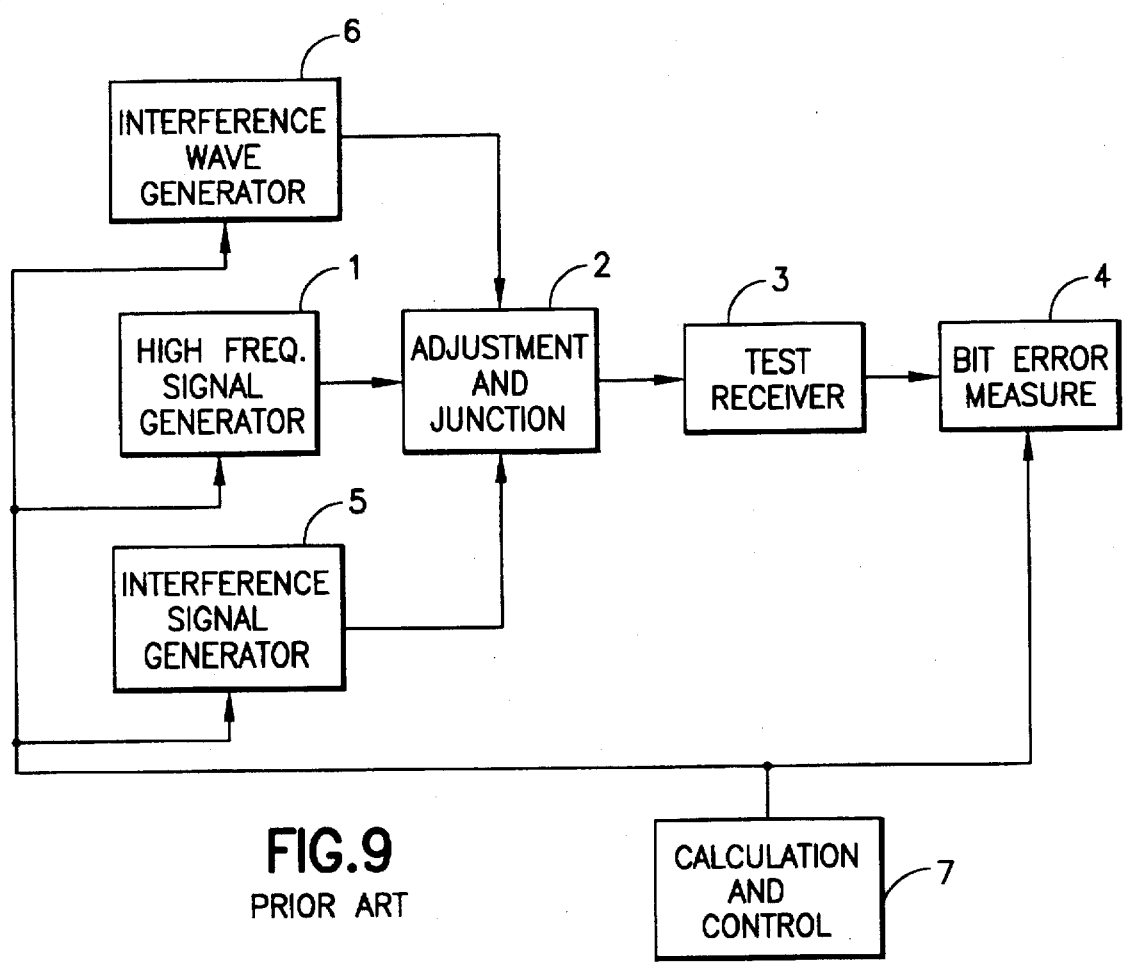
FIG. 9: Diagram showing an example of the make-up of the sensitivity and interference characteristics measurement device.

If the error of the second-order approximation equation is above the allowed value, it is judged that the bit error rate vs. reception input level characteristic is far from the theoretical value and the operation is switched to a second estimation means. In this estimation method, two input levels are obtained which are close to the desired level and lie on either side of it (the method for doing this will be discussed below). A linear approximation equation (first-order approximation equation) is obtained from these input levels and bit error rates; the desired level is estimated, and the measurement is completed. These processes are controlled by the program of calculation and control part 7 in FIG. 9.

Next, the first estimation means will be discussed in detail. The theoretical value of the relationship of the bit error rate to the reception input level is expressed by an exponential function, but in practice it can be approximated by a second-order equation. The bit error rate vs. reception input level relationship is measured at several input levels and the second-order approximation equation is obtained from these measurement values. The error of this approximation equation is calculated and if this error is smaller than the allowed value, it is judged that the relationship of the bit error rate to the reception input level can be estimated from the second-order equation. Moreover, the desired level is obtained from the prescribed bit error rate, using this second-order equation.

Figure 1:
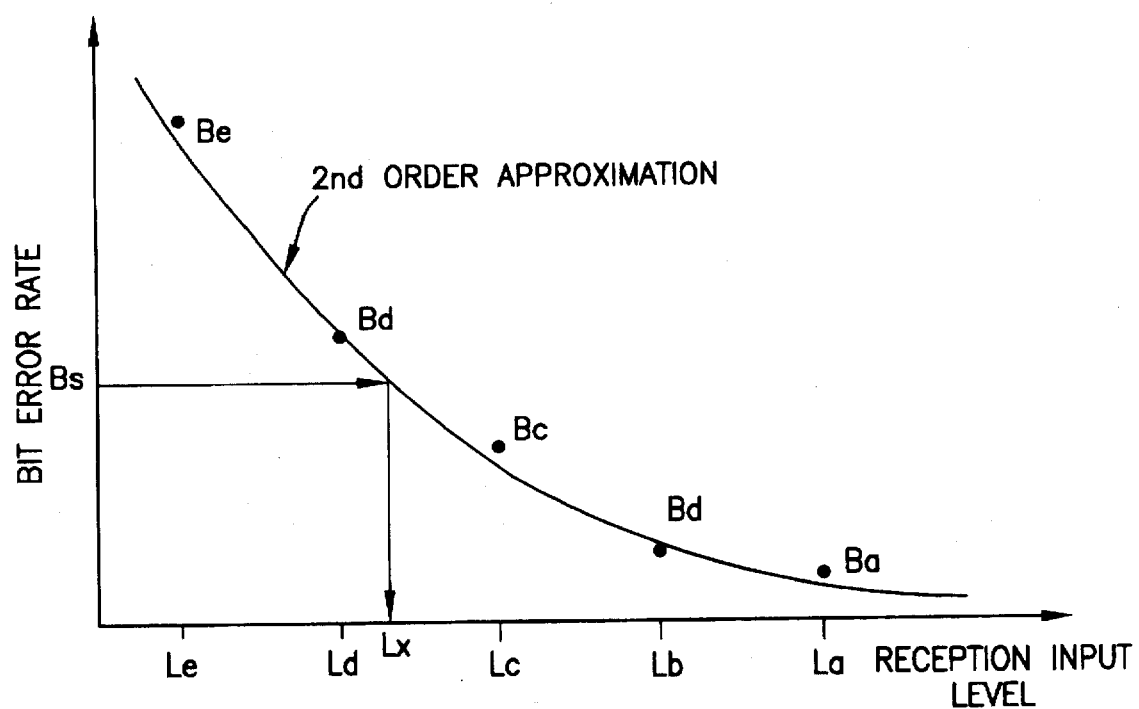
FIG. 1: Diagram showing an example of performing a second-order approximation estimation of the sensitivity measurement according to this invention.

FIG. 1 shows the process of obtaining the relationship between the bit error rate and the reception input level and the process of obtaining the second-order function in the case of the sensitivity measurement. In the example shown in this figure, the approximation equation is obtained from five bit error rate measurement values. Furthermore, in the measurement of the interference wave characteristics, the diagram becomes a mirror image of FIG. 1.

The process of obtaining the approximation equation is as follows: first, the operator predicts the reception input level which will probably yield the prescribed bit error rate Bs from the specifications or theoretical values, etc., of the test receiver. This forecast input level is inputted into the measurement device. Then, the calculation is controlled according to the following algorithm.

(1) The reception input level is set in a specific range, with the inputted forecast input level Lc at its center, and the optimum point Ba and the worst point Be of the bit error rate are measured.

(2) The prescribed bit error rate Bs is confirmed to be between Ba and Be. If it is not, the reception input levels La and Le are changed so that Bs lies between them.

(3) Next, the remaining three points Bb, Bc and Bd are measured, and the coefficients of the secondary approximation equation are obtained from these five data by the least squares method.

(4) The differences between the bit error rates obtained by substituting into this approximation equation the five measured reception input levels (from La to Le), and the measured bit error rates (from Ba to Be) are substituted into an evaluation function (e.g., the square sum mean) and it is detected whether or not the error is at or below the allowed value. If the error is at or below the allowed value, Bs is substituted into the approximation equation obtained and the second-order equation is solved. The desired level Lx is obtained, and the measurement is completed.

If the aforementioned error is greater than the allowed value, the characteristic is judged to be far from the second-order equation, and the operation moves to the 2nd estimation means.

Here, the desired reception input level is obtained by a linear approximation from the measured values of the bit error rate at two points on either side of the point at which the prescribed bit error rate Bs is obtained. The method for obtaining two input levels which are near the desired level and on either side of this level is that the two points are searched for, starting from a certain input level.

Figure 2:
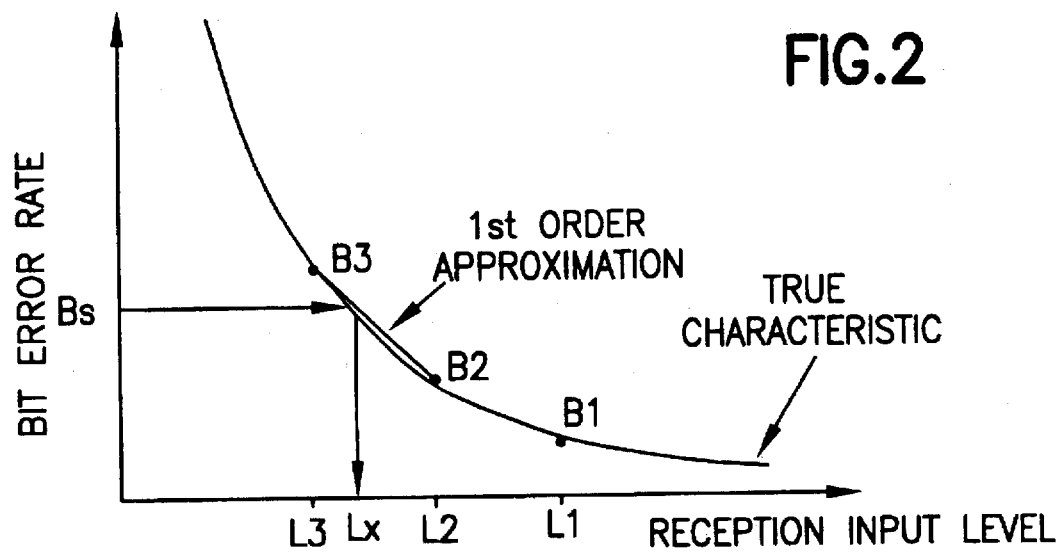
FIG. 2: Diagram showing an example for performing a first approximation estimation of the sensitivity measurement according to this invention.

FIG. 2 shows the process in this case. Moreover, calculation and control part 7 controls the operation according to the following algorithm.

(1) Input levels which show values near the desired level are selected from the five measurement data measured in the first estimation means; the reception input level at the beginning of the search is called L1. In FIG. 2, in order to show the search process, the input level L1 at the start of the search is a level which is unrelated to the measurement data of the first estimation means.

(2) The bit error rate B1 is measured at the starting point of the search.

(3) The magnitudes of B1 and Bs are compared, and the reception input level is changed in the direction such that the next measurement value B2 is closer to Bs; the bit error rate at this level is measured.

Figure 3:
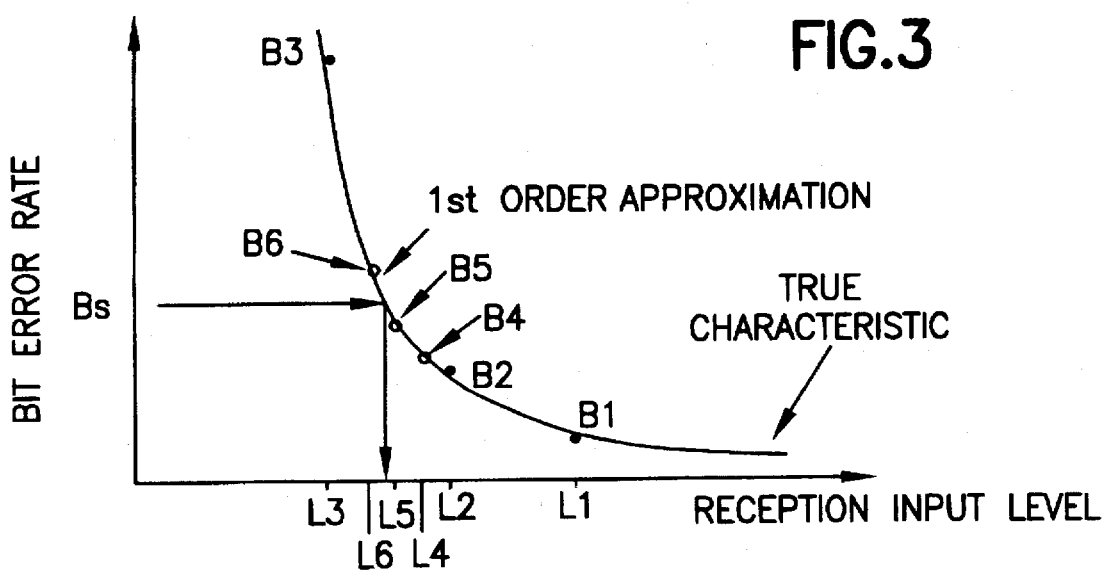
FIG. 3: Diagram showing an example of performing the second-order approximation estimation of the sensitivity measurement according to this invention.
Figure 4:
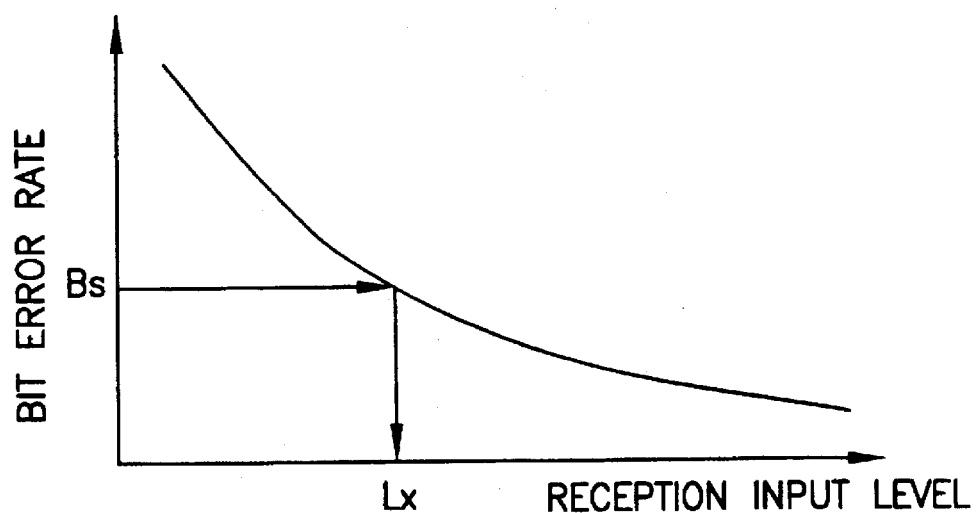
FIG. 4: Diagram showing the characteristics of bit error rate vs. reception signal level.
Figure 5:
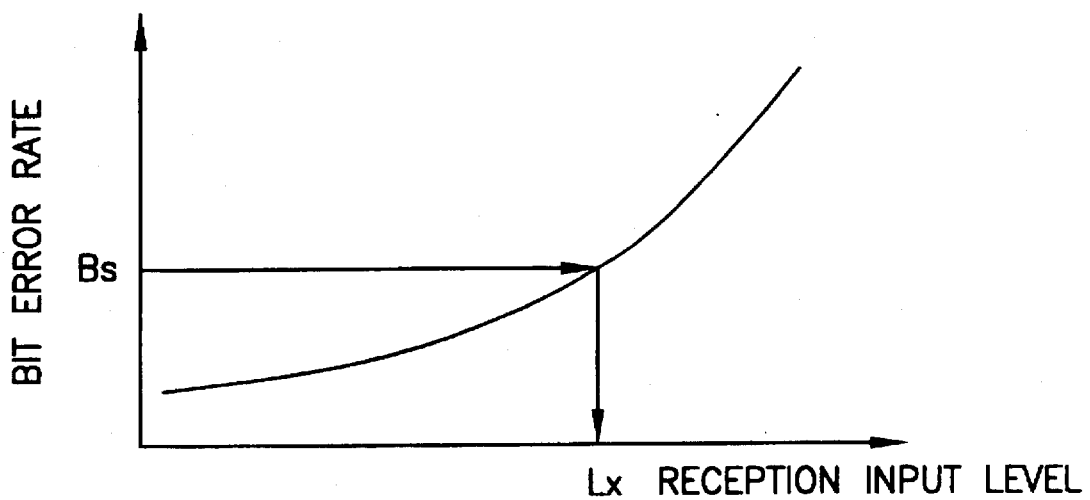
FIG. 5: Diagram showing the characteristics of the bit error rate vs. interference wave level.
Figure 6:
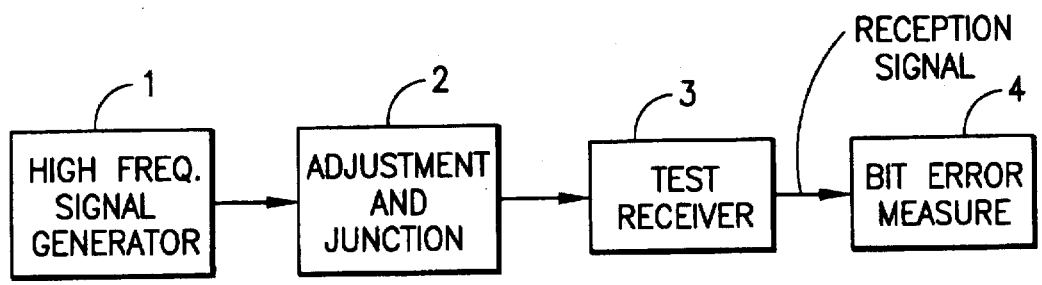
FIG. 6: Diagram of the make-up of the sensitivity measurement.
Figure 7:
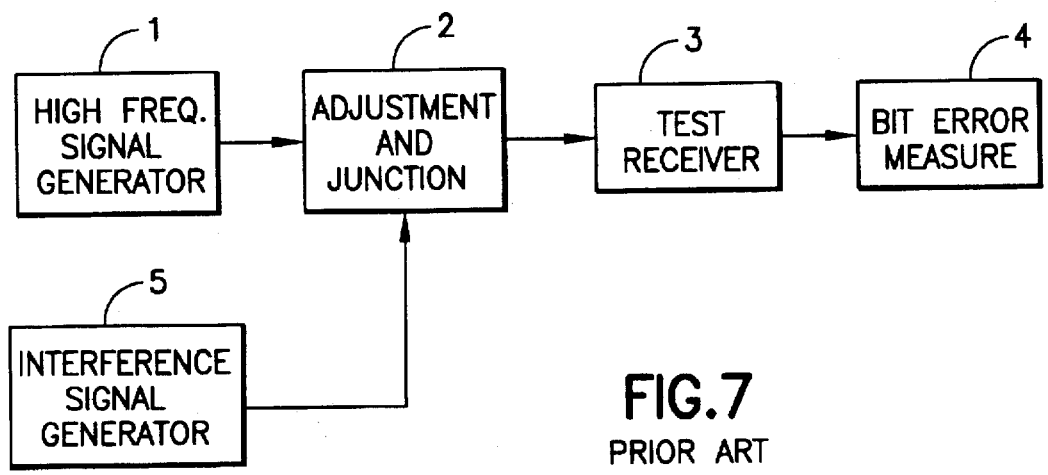
FIG. 7: Diagram of the make-up of the adjacent channel selectivity measurement and the spurious sensitivity measurement.
Figure 8:
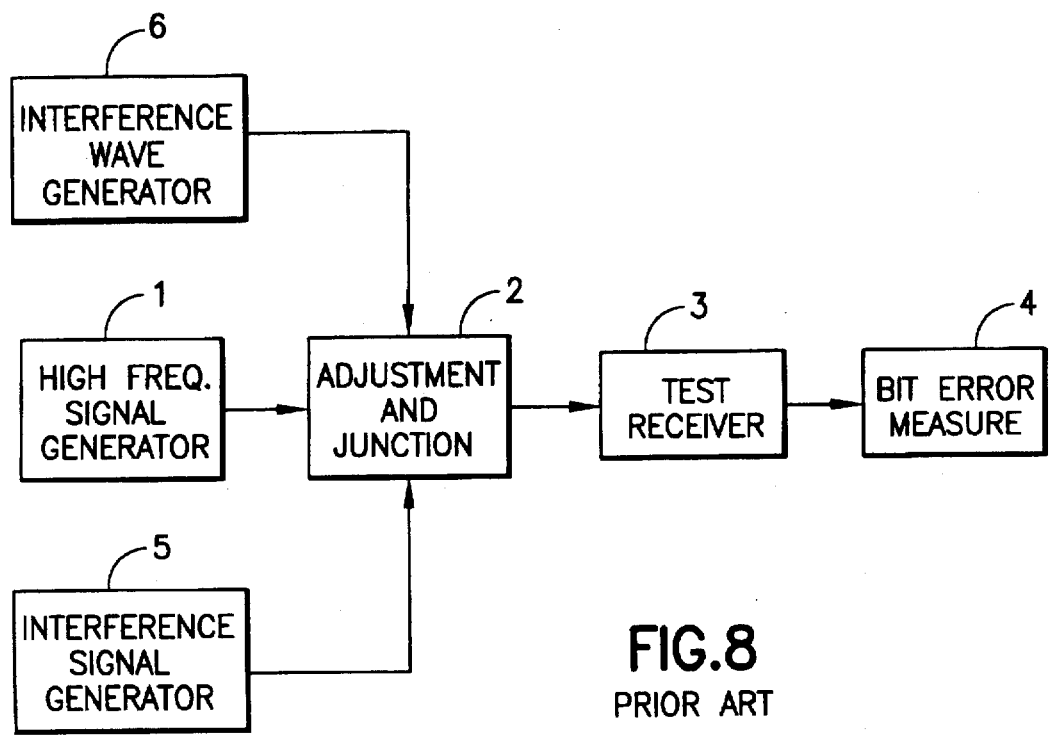
FIG. 8: Diagram of the make-up of the intermodulation characteristics measurement.

(4) This operation is repeated until the magnitude relationship of the measured value of the bit error rate and Bs is reversed. In FIG. 2, it is reversed at B3. When it is reversed, as shown in FIG. 3, if the ratio of Bs to B3 is greater than the prescribed value, it is judged that B3 is not near Bs. Moreover, the procedure returns to a point before the reversal (in the example, B2), and the amount of change of the reception input level is made smaller (for example, $\frac{1}{10}$); the search is performed again. Moreover, it is repeated until the magnitude relationship between the measured value of the bit error rate and Bs reverses. In FIG. 3, it reverses at B6.

(5) When the magnitude relationship reverses, the repeating operation stops. The point at which the reversal occurs and the point immediately before the reversal are the two points which are near the desired level and on either side of this level.

(6) A linear interpolation (first-order approximation) is made with the data of these two points, and Lx is obtained; the measurement is completed. Furthermore, if the desired level of the test receiver is judged almost exactly, the first estimation means can also be skipped and the second estimation means performed. In this case, the beginning point of the search may be regarded as this judged value.

Since the characteristic of the bit error rate vs. reception input level is a curve, it can be estimated more accurately, in general, by a second-order approximation than by a linear approximation. Since the second estimation means makes a linear interpolation (approximation) using two points, the interval between these two points must be narrower than in the first estimation means in order to make an accurate estimation. In contrast to this, since the first estimation is a second-order approximation, measurement data within a wider range of reception input levels can be used to realize the same accuracy. Therefore, highly accurate, efficient measurements, with little deviation from the goal, can be performed even with a limited number of measurements.

In the case of characteristics which change dramatically, the first estimation means has the drawback that the error can become large. This drawback is compensated for in the second estimation means. The drawback of the second estimation means is that there are cases in which the number of measurements must be made large in order to maintain accuracy. However, since the measurement results of the first estimation means can be used, the number of measurements can be reduced.

This invention, by using the advantages of the first and second estimation means effectively, makes it possible to measure the sensitivity and interference wave characteristics of receivers with any characteristics.

An actual example of this invention is shown above, but this invention is not limited to the search method and other aspects of the example shown if desired, modifications in the make-up of this invention are permitted, as long as its gist is maintained.

Effectiveness of Invention

According to this invention, the advantages of two estimation means are used effectively, making possible highly accurate, efficient measurements on receivers with any characteristics; thus, its practical value is great.

We claim:

1. A system for measuring sensitivities and interference wave properties of receivers, comprising:

first estimating means and second estimating means for estimating a reception input level at which a receiver's bit error rate becomes a prescribed value; and control means for operating said first estimating means to derive an estimation error between at least one estimated bit error rate and at least one measured bit error rate value and when said error is less than a predetermined value, to estimate the reception input level; and when said error is greater than the predetermined value, causing operation of the second estimating means to estimate the reception input level.

2. A system for measuring in accordance with claim 1, wherein said control means operates said first estimating means to measure the bit error rate at four or more reception input levels, said first estimating means employing a second-order equation to approximate a relationship between the reception input level and the bit error rate, on the basis of the measurement result, and to estimate an error of said second order equation by substituting said reception input levels into said second-order equation and determining the estimated bit error rate; but if said error is smaller than the predetermined value, the predetermined value of the bit error rate is substituted into said second-order equation and a reception input level which corresponds to the predetermined value is obtained.

3. A system for measuring in accordance with claim 1, wherein said control means operates said second estimating means to move the reception input level successively closer to a level corresponding to the predetermined value, starting from a determined reception input level; and to measure the bit error rate, said second estimating means employing a first-order equation to approximate a relationship between the reception input level and the bit error rate, on the basis of points just prior to and just after the prescribed value when the bit error rate value exceeds the predetermined value; said second estimating means substituting the prescribed value into said first-order equation to obtain a reception input level which corresponds to the prescribed value.

* * * * *

UNITED STATES PATENT AND TRADEMARK OFFICE
CERTIFICATE OF CORRECTION

PATENT NO. : 5,691,988
DATED : November 25, 1997
INVENTOR(S) : Yamada, et al

It is certified that error appears in the above-indentified patent and that said Letters Patent is hereby corrected as shown below:

On the title page, item [54] and Column 1, line 3:

In the title, change "FO" RECEIVERS to "OF" RECEIVERS col. 8, cl. 3, lines 18, 19, change "prescribed" to --predetermined-- col. 8, cl. 3, line 20, change "prescribed" to --predetermined--

Signed and Sealed this

Twenty-third Day of June, 1998

Attest:

BRUCE LEHMAN

*Attesting Officer*     *Commissioner of Patents and Trademarks*